(12) United States Patent
Wuchterl (10) Patent No.: US 11,391,345 B2
(45) Date of Patent: Jul. 19, 2022

(54) CABLE TENSIONING DEVICE

(71) Applicant: Landscape Structures Inc., Delano, MN (US)

(72) Inventor: Kent David Wuchterl, Forest Lake, MN (US)

(73) Assignee: Landscape Structures Inc., Delano, MN (US)

( * ) Notice: Subject to any disclaimer, the term of this patent is extended or adjusted under 35 U.S.C. 154(b) by 125 days.

(21) Appl. No.: 16/856,556

(22) Filed: Apr. 23, 2020

(65) Prior Publication Data

US 2021/0324940 A1 Oct. 21, 2021

Related U.S. Application Data (60) Provisional application No. 63/012,308, filed on Apr. 20, 2020.

(51) Int. Cl.
*F16G 11/12* (2006.01)
*F16G 11/02* (2006.01)
*A63B 9/00* (2006.01)

(52) U.S. Cl.
CPC .............. *F16G 11/12* (2013.01); *A63B 9/00* (2013.01); *F16G 11/025* (2013.01); *A63B 2009/004* (2013.01); *A63B 2009/006* (2013.01)

(58) Field of Classification Search
CPC ...... A63B 9/00–2009/008; F16G 11/12; F16G 11/025; Y10T 403/44; Y10T 403/443; Y10T 403/447; F16L 3/02; F16B 7/06; E04B 2001/3583; E04B 5/08; E04C 5/12; E04C 5/122; E04C 5/125; E04C 3/02; E04C 3/10; E04D 19/16; E04F 2011/1882; E04F 15/06; E04H 12/16; E04H 17/24
See application file for complete search history.

(56) References Cited

U.S. PATENT DOCUMENTS

| | | | | |
|---|---|---|---|---|
| 4,172,676 | A * | 10/1979 | De Chant | F16B 7/06 29/896.7 |
| 2005/0133771 | A1* | 6/2005 | Kohler | F16G 11/048 254/232 |
| 2007/0275828 | A1* | 11/2007 | Kohler | A63B 9/00 482/35 |
| 2009/0212146 | A1* | 8/2009 | Kohler | A63B 9/00 242/147 R |
| 2014/0137388 | A1* | 5/2014 | Campbell | B23P 11/00 29/461 |
| 2014/0138596 | A1* | 5/2014 | Ross | E04F 11/1859 256/47 |
| 2015/0300452 | A1* | 10/2015 | Campbell | F16G 11/042 403/275 |
| 2018/0003202 | A1* | 1/2018 | White | F16B 2/065 |
| 2019/0346019 | A1* | 11/2019 | Jones | A63B 9/00 |

* cited by examiner

*Primary Examiner* — Joshua Lee
*Assistant Examiner* — Catrina A Letterman
(74) *Attorney, Agent, or Firm* — Christopher R. Christenson; Kelly, Holt & Christenson, PLLC (57) ABSTRACT

A piece of playground equipment is disclosed and includes a system for tensioning one or more cables. The system includes a cable retaining device having a cylindrical shaped body with threads disposed around an outer circumferential surface, the outer circumferential surface being interrupted in at least one location by one or more cable receiving channel. The system also includes a tightening sleeve into which the cable retaining device is configured to be threaded such that the cable retaining device moves as the tightening sleeve is rotated.

18 Claims, 13 Drawing Sheets

CABLE TENSIONING DEVICE

BACKGROUND

Play equipment in the nature of cable based climbing structures are known in the art. This type of structure can be challenging to install and maintain at least because mechanisms for adjusting cable tension are often complex or difficult to access.

SUMMARY

A piece of playground equipment is disclosed and includes a system for tensioning one or more cables. The system includes a cable retaining device having a cylindrical shaped body with threads disposed around an outer circumferential surface, the outer circumferential surface being interrupted in at least one location by one or more cable receiving channel. The system also includes a tightening sleeve into which the cable retaining device is configured to be threaded such that the cable retaining device moves as the tightening sleeve is rotated.

These and various other features and advantages that characterize the claimed embodiments will become apparent upon reading the following detailed description and upon reviewing the associated drawings.

DETAILED DESCRIPTION OF ILLUSTRATIVE EMBODIMENTS

There are many considerations when it comes to designing a playground structure. One common consideration is that the structure should be durable enough to withstand weather and/or heavy use without accumulating too much wear and tear. Another common consideration is that the structure should be entertaining to the user while at the same time being vandal and theft resistant. Another common consideration is that the structure should require minimal maintenance. These are just examples of common considerations. For cable based climbers, there are even some unique considerations. For example, at least due to variations in terms of manufacturing tolerances related to cable lengths, it is desirable to provide one or more convenient mechanisms for adjusting cable tension during install. Such a tensioning mechanism is also desirable because a normal cable can experience some degree of expansion over time, thus requiring a maintenance re-tensioning in order to maintain a tautness.

Figure 1:
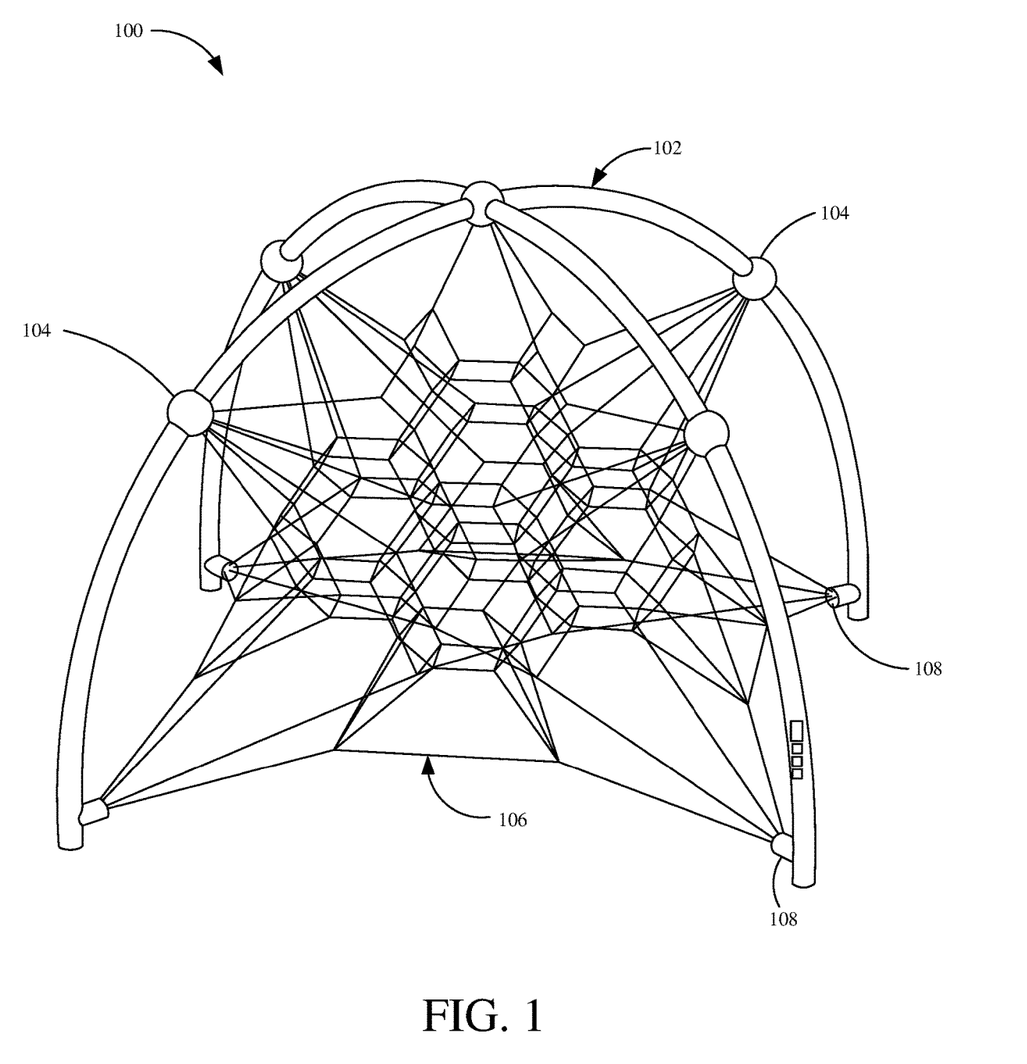
FIG. 1 is a perspective view showing an example play structure.

FIG. 1 is a perspective view showing an example play structure 100. Play structure 100 includes a frame 102 upon which a cable structure, made of cables 106, is supported. The cable structure as shown includes a specific shape, however, in other examples the cable structure can be shaped differently and include a different amount of cables 106. Cables 106 are coupled to frame 102 at least at cable mounts 108 and housings 104. As shown, housings 104 are shaped as spherical objects. However, in other examples, housings 104 can include a different shape. Further, housing 104 can be more integrated into frame 102 and have limited or no shape separate from the natural flow of frame 102. Cable mounts 108, as shown, are generally tubular protrusions extending from frame 102. Of course, they need not necessarily be tubular. In other examples, cable mounts 108 can even be a different type of mechanism all together.

Figure 2A:
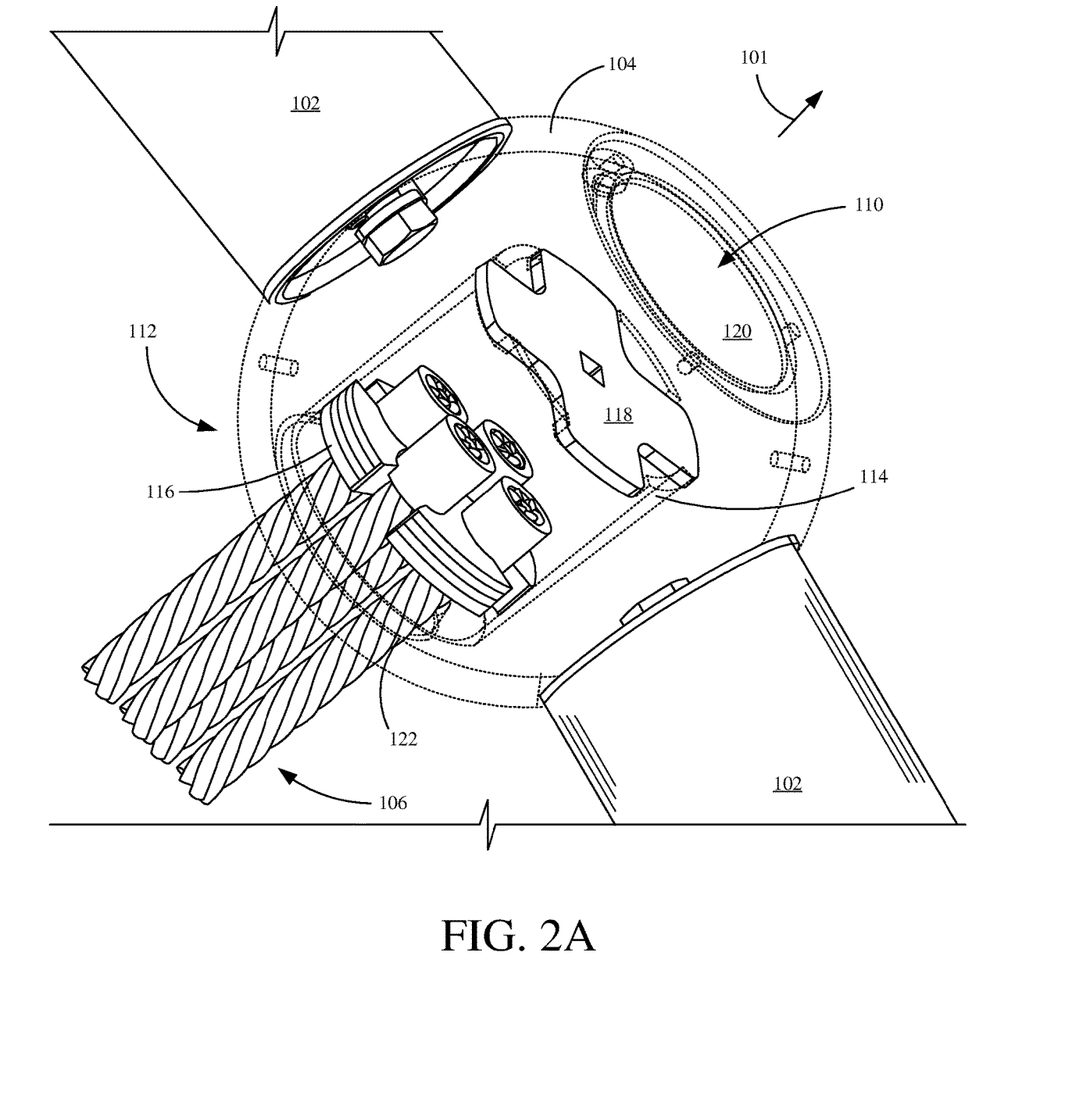
FIG. 2A is a perspective view showing an example housing.
Figure 2B:
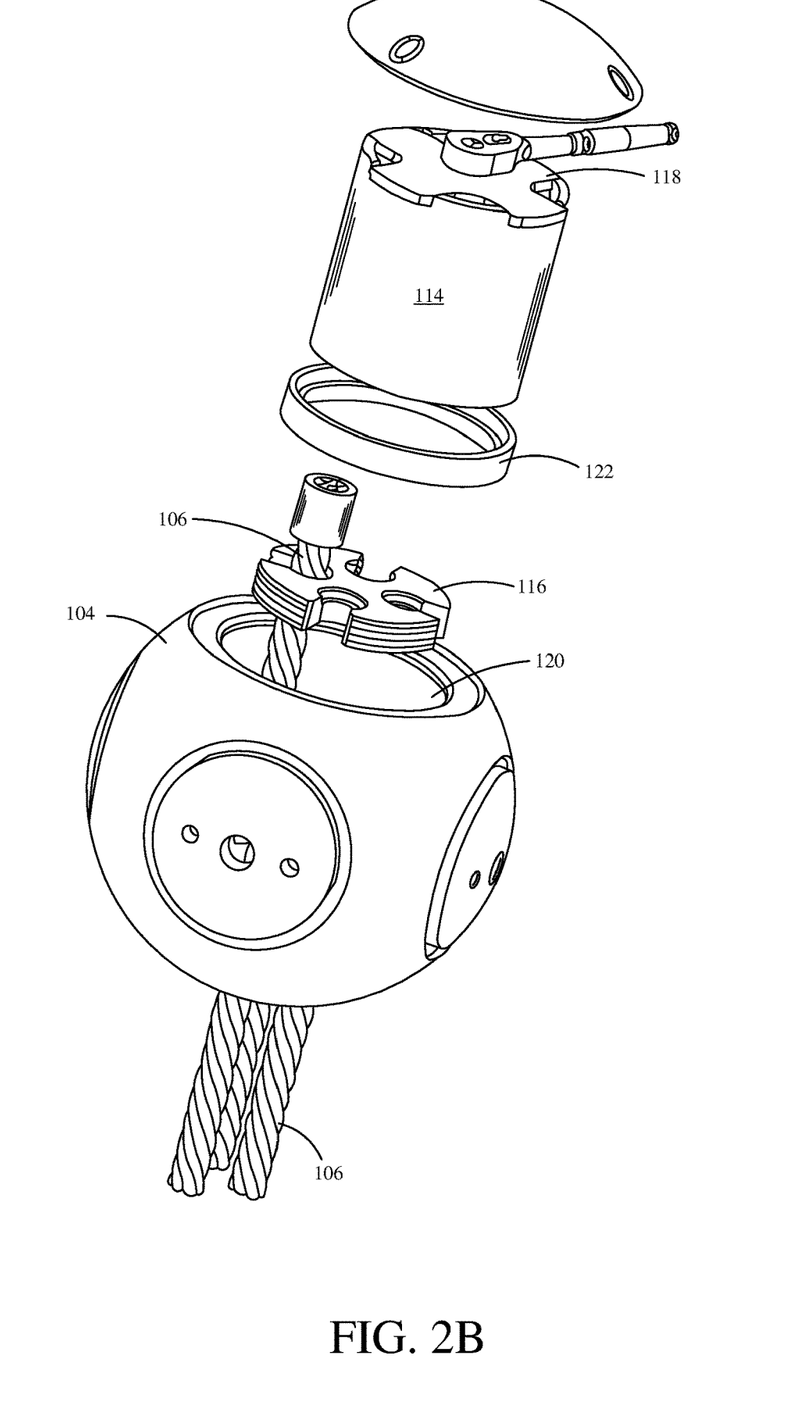
FIG. 2B is an exploded view showing the example housing.

FIG. 2A is a perspective view showing an example housing 104. FIG. 2B is an exploded view showing the example housing 104. FIGS. 2A-2B are hereinafter referred to collectively as FIG. 2. Housing 104 includes an interior space 120 that is accessible via openings 110 and 112. Cables 106 are inserted through opening 112 and coupled to a retaining device 116. As shown, opening 112 is a single hole through which all cables 106 are inserted. In other examples, there may be more than one opening 112 that allows a subset of cables 106 to be passed through. For example, there may be an opening 112 for each cable 106.

Retaining device 116, as shown, includes a threaded portion that engages a threaded portion of tightening sleeve 114. Tightening sleeve 114 includes a tool interface 118 that is accessible via opening 110. A tool that engages tool interface 118 rotates or otherwise actuates sleeve 114. As shown, tool interface 118 includes a square shaped hole in a 4-pronged plate that engages 4 slots of sleeve 114. In some examples, the plate can be welded or otherwise coupled to sleeve 114. In some examples, the square shaped hole can be replaced by another tool engaging feature, e.g., a hex shaped hole, a hex shaped protrusion, square shaped protrusion, etc.

To reduce friction, an interface 122 can be provided between housing 104 and tightening sleeve 114. For example, interface 122 can include an ultra-high molecular weight plastic, brass, or other low friction material to ease rotation of sleeve 114. In another example, interface 122 includes a bearing such as but not limited to a head race bearing.

Rotating tightening sleeve 114 in a given direction (e.g., clockwise) causes retaining device 116 to gradually be actuated in a direction indicated by arrow 101. This actuation causes a tightening of cables 106 across the overall cable climber structure. The plurality of cables 106 generally prevent retaining device 116 from rotating with tightening sleeve 114. In an example, where there is fewer or even only one cable 106, retaining device 116 can be rotated (or prevented from being rotated) by a tool.

Figure 3:
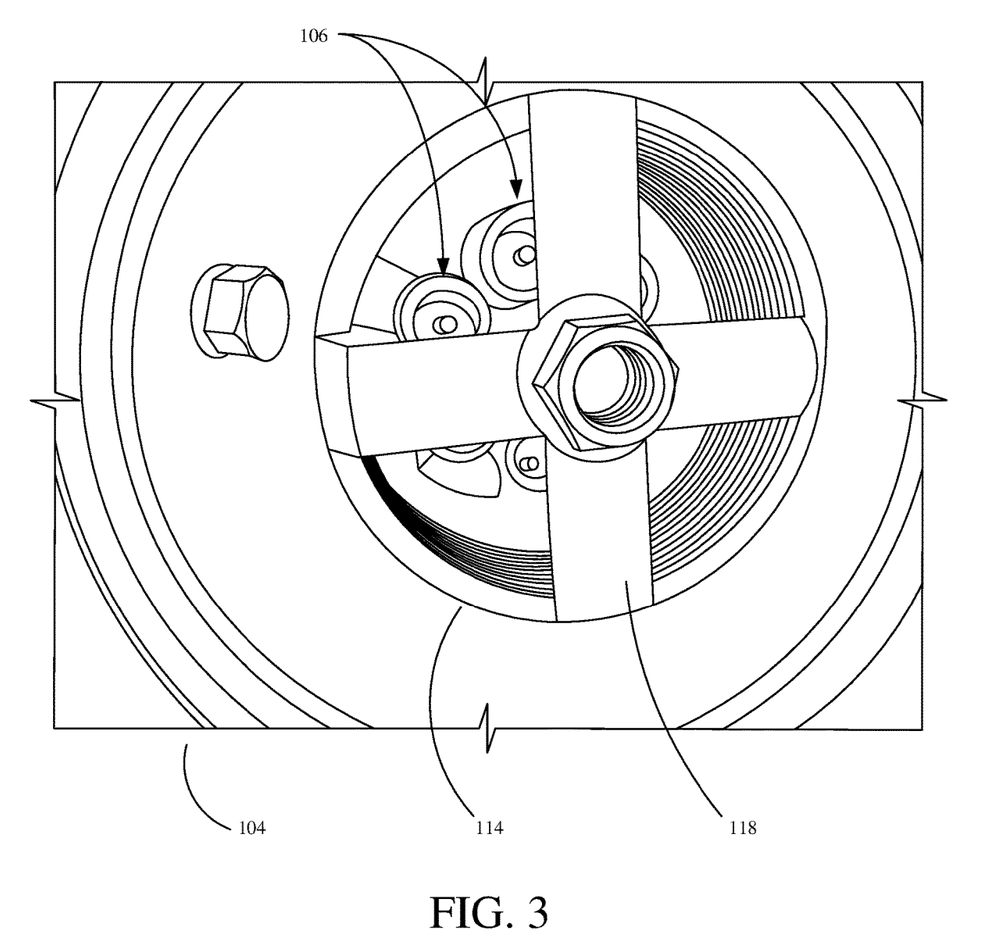
FIG. 3 is a view showing an example interior of a housing.

FIG. 3 is a view of interior space 120 of housing 104 generally looking through opening 110. As shown, tool interface 118 includes a hex drive. A tool such as a socket wrench can be used to interface with tool interface 118 to rotate sleeve 114 and therefore tighten cables 106.

Figure 4:
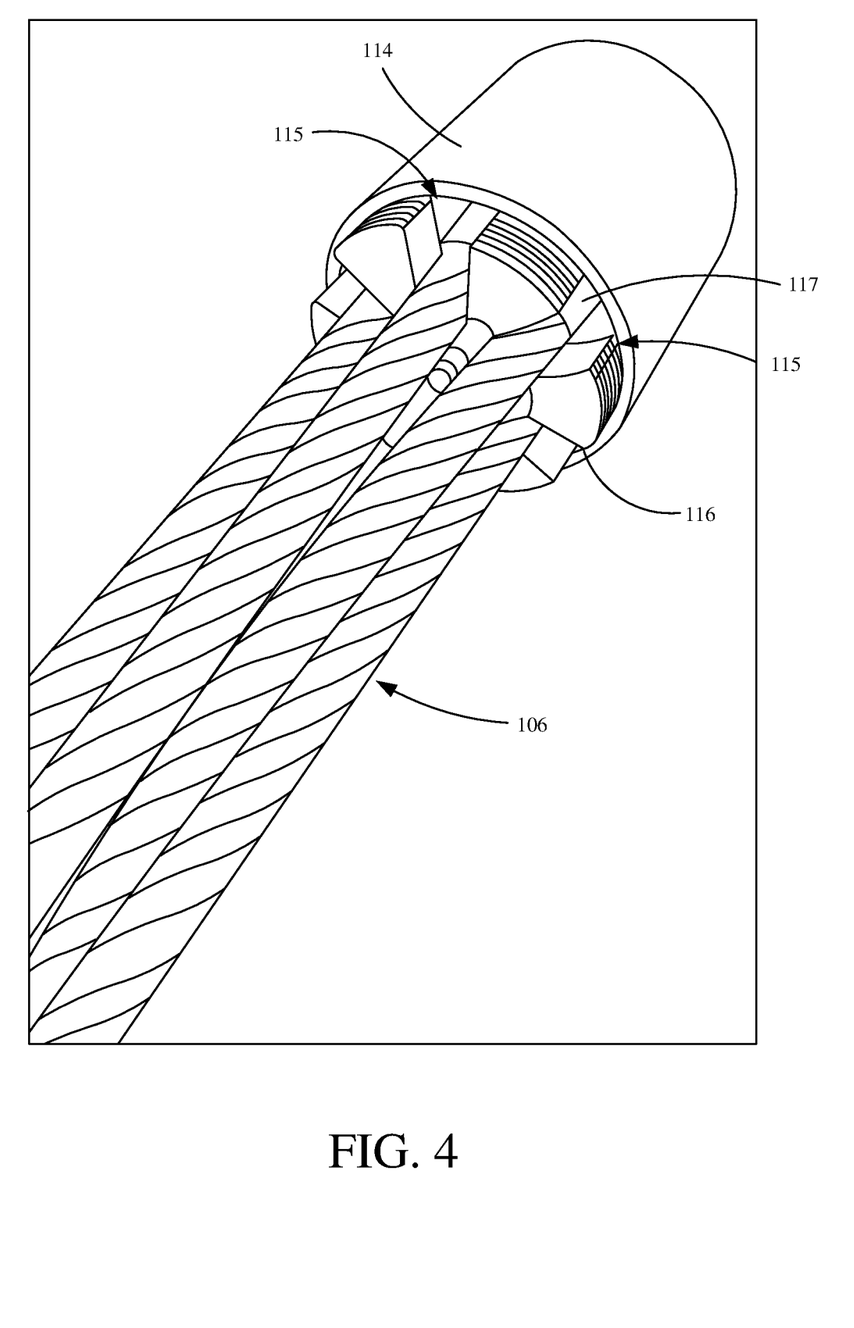
FIG. 4 is a perspective view showing a cable retainer and sleeve assembly.

FIG. 4 is a perspective view showing a cable retainer and sleeve assembly. Shown cables 106 are inserted into retainer 116 which is engaged with sleeve 114. As shown, there are four cables 104, however in other examples there may be a greater or smaller number of cables 106. Cables 160, as shown, are coupled to retainer 116 by being inserted into various channels 115 of retainer 116. Cables 106 are laterally inserted through channels 115 prior to retainer 116 being engaged with sleeve 114. Cables 106 are prevented from pulling through channels 115 because they have cable ends 117 that are sized to stop this from happening. Additionally, when retainer 116 is within sleeve 114, cables 106 are prevented from being laterally removed from retainer 116, as sleeve 114 generally blocks this.

Figure 5:
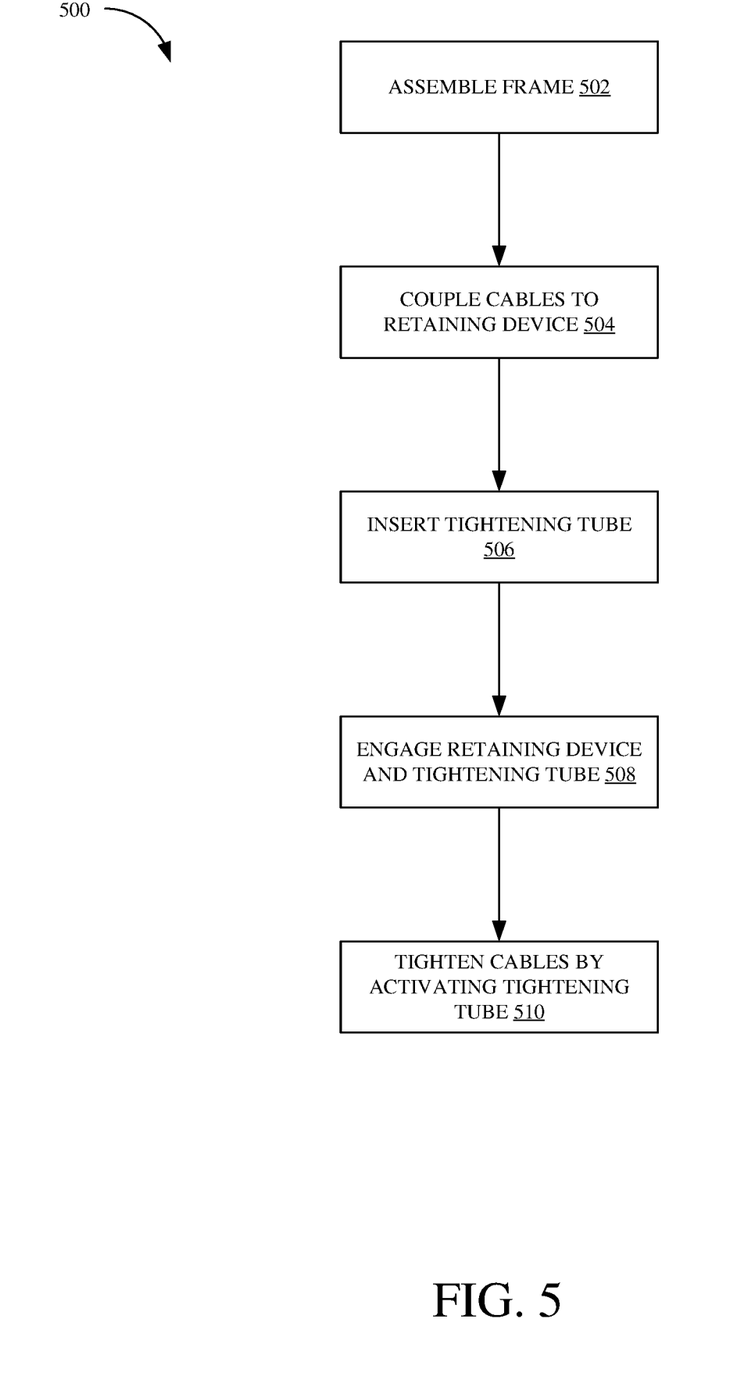
FIG. 5 is a flow diagram showing one assembly operation.

FIG. 5 is a flow diagram showing one assembly operation, though other progressions are conceivable. Operation 500 begins at block 502, where the frame 102 is assembled.

Operation 500 proceeds to block 504, where the cables are inserted through housing 104 and coupled to the retaining device 116. For example, the cables are inserted through opening 110 and laterally slid into channels 115 of retaining device 116. In another example, retaining device 116 does not have channels 115 but rather has apertures through which the cables are inserted and cannot be pull through because of cable ends 117. Of course, cables can be coupled to the retaining device in other ways as well, such as, clamping, etc.

Operation 500 proceeds to block 506 where the retaining devices inserted into where the tightening sleeve is inserted into housing 104.

Operation 500 proceeds to block 508, where the retaining device is engaged with the tightening sleeve inside housing 104. Engaging the retaining device and tightening sleeve can involve engaging the threads of the retaining device with the threads of the tightening sleeve.

Operation 500 proceeds to block 510 where the can cables are tightened by actuating the tightening sleeve. For example, the tightening sleeve is actuated by tool engaging tool interface 118. As sleeve 114 rotates, cables 106 prevent retaining device 116, from rotating such that retaining device 116 is actuated in a given direction. That is based on the rotation of sleeve 114.

Figure 6:
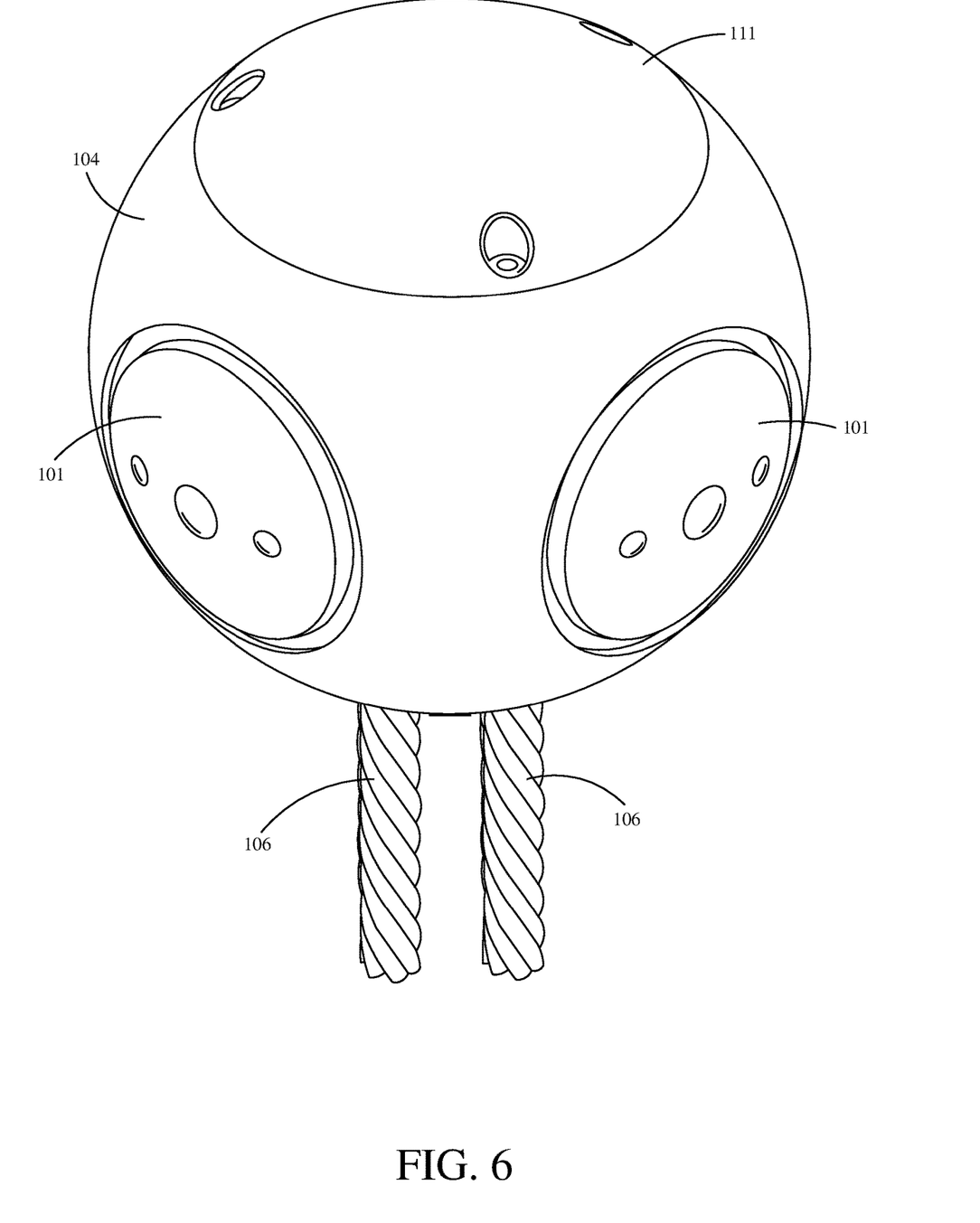
FIG. 6 is a perspective view showing an example housing assembly.

FIG. 6 is a perspective view showing an example housing 104 assembly. As shown, opening 110 of housing 104 is covered by a cover 111. Cover 111 can be coupled to housing 104 through a fastener connection (e.g., bolts, screws, etc.). Cover 111 protects interior 120 of housing 104 and prevents adjustment of tightening sleeve 114. As shown, housing 104 includes frame interfaces 101. Frame interface 101 allow housing 104 to couple to pieces of the frame 102. (E.g. see FIG. 1).

Figure 7:
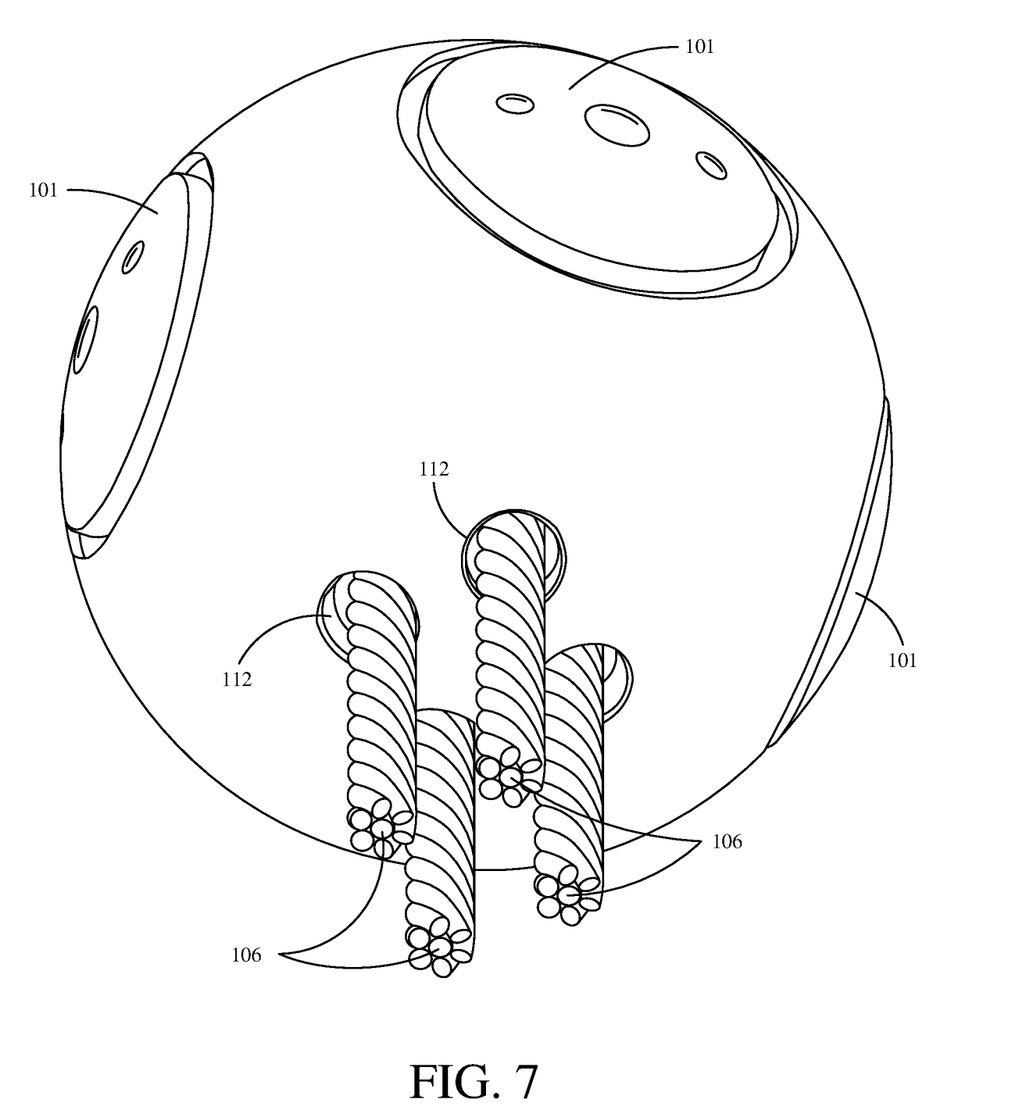
FIG. 7 shows a bottom perspective view of housing assembly.

FIG. 7 shows a bottom perspective view of housing assembly 104. From this view, it can be seen where cables 106 enter housing 104. For example, each cable 106 enters through an individual opening 112 of housing 104. In another example, one or more cables 106 may share a single opening 112.

Figure 8:
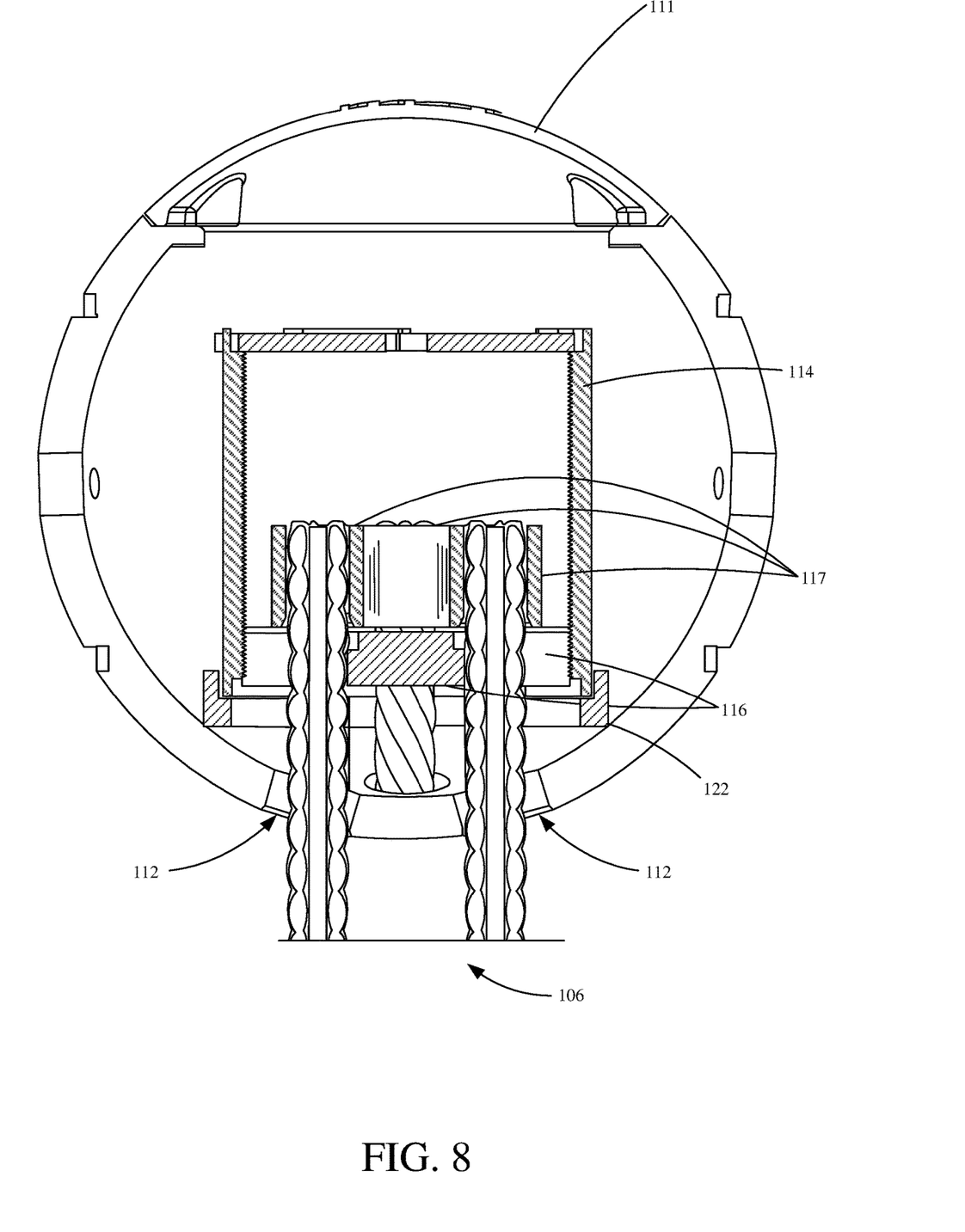
FIG. 8 is a sectional view showing an example housing assembly.

FIG. 8 is a sectional view showing an example housing 104 assembly. As shown, cover 111 is coupled to housing 104 and retainer 116 is engaged with tightening sleeve 114. Tightening sleeve 114 seats against housing 104 via interface cap 122. As shown, interface cap 122 includes a low friction material such that tightening sleeve 114 can rotate with less friction. In another example, interface cap 122 can include a bearing.

As shown, cables 106 are retained within retained device 116 by cable ends 117. Cable ends 117 prevent cables 106 from being removed vertically from retained device 116 and tightening sleeve 114 prevents cables 106 from being removed laterally from retainer device 116.

In this view, it can be seen that cables 106 include an interior metal portion and an exterior rope portion. In other examples, cable 106 can be a different type cable as well.

Figure 9:
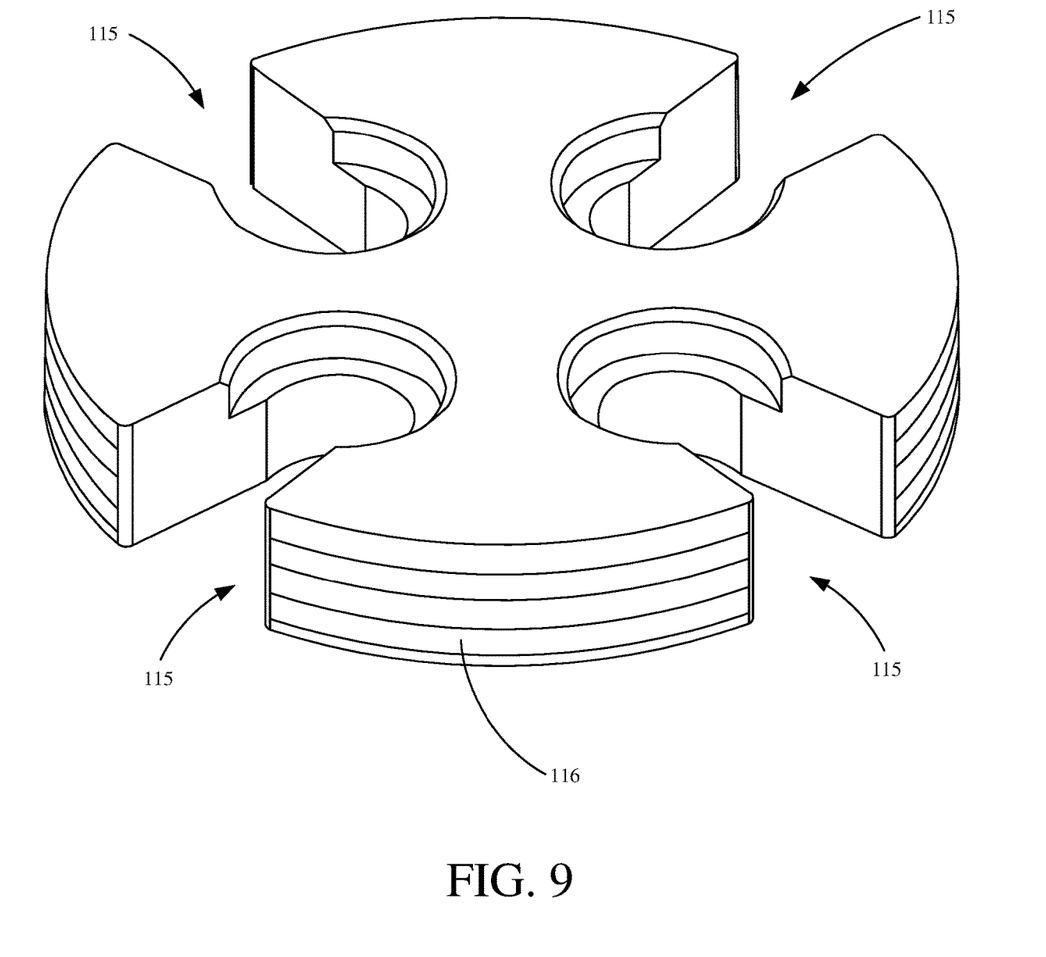
FIG. 9 is a top perspective view showing an example cable retaining device.

FIG. 9 is a top perspective view showing an example cable retaining device 116. As shown, cable retaining device 116 has threads on all external surfaces. In other examples, threads are only present on some external surfaces (e.g., two out of four). Also shown, there are four channels 115 that allow that retain cables 106. In other examples, there may be a different number of channels 115 that allow for a different number of cables 106. In some examples, more than one cable 106 can fit in a given channel 115.

Figure 10A:
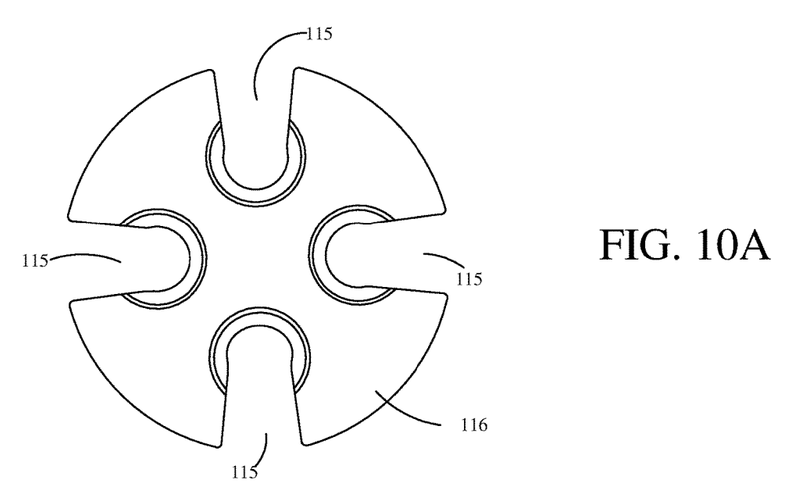
FIG. 10A is a top view showing an example embodiment of a cable retaining device.
Figures 10B, 10C:
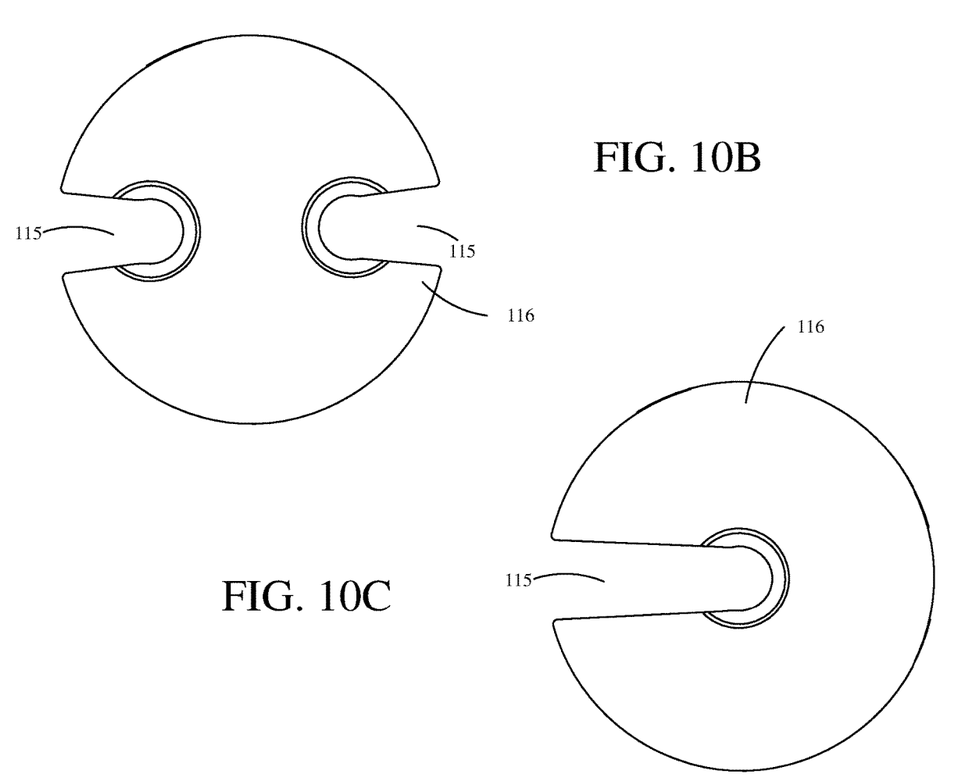
FIG. 10B is a top view showing another example embodiment of a cable retaining device.
FIG. 10C is a top view showing another example embodiment of a cable retaining device.

FIG. 10A is a top view showing a first example embodiment of a cable retaining device 116. As shown, cable retaining device 116 includes four cable channels 115. FIG. 10B shows a second example embodiment with two cable channels 115. FIG. 10C shows a third example embodiment with only one cable channel 115. Each cable retaining device is illustratively, though not necessarily, puck shaped and includes threads on the outer circumferential surface, as has been described in relation to other Figures. In other examples, there may be any number of channels.

Figure 11:
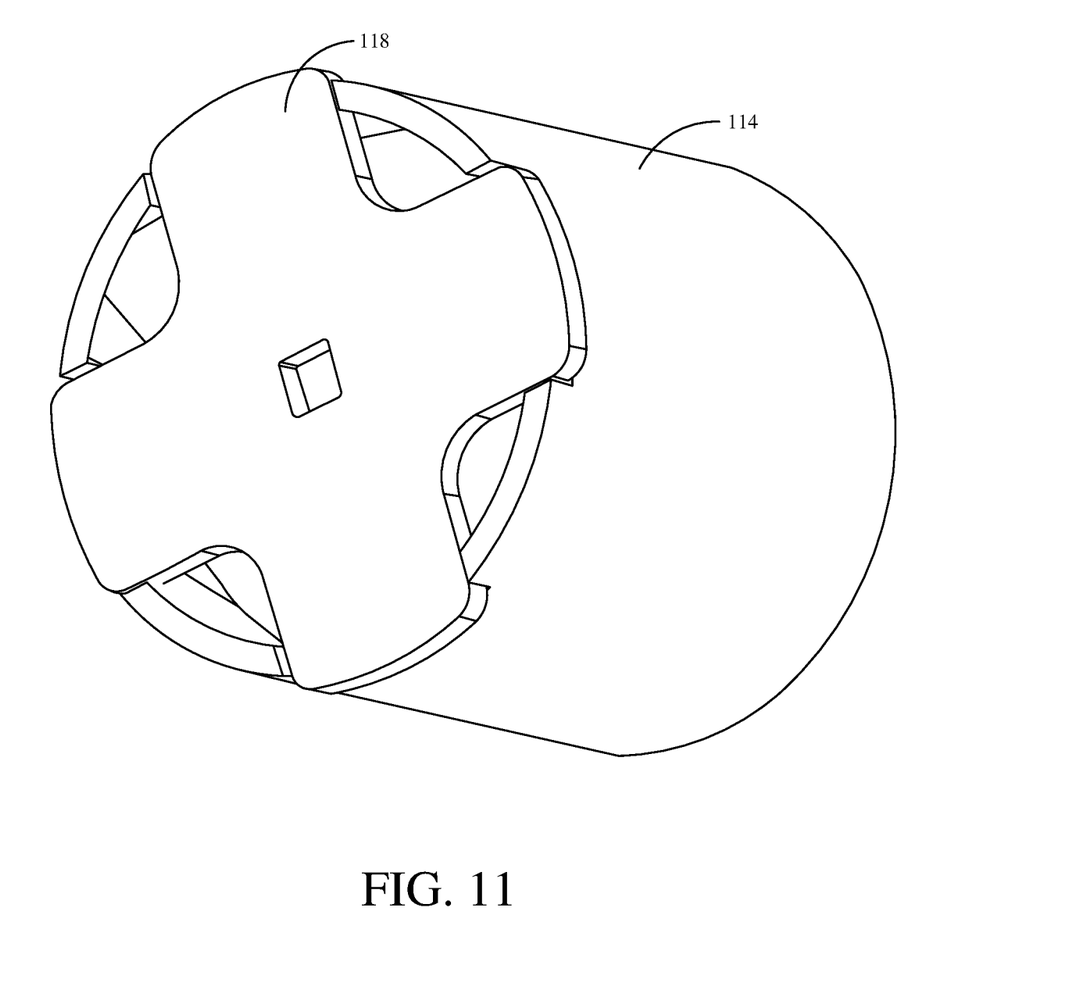
FIG. 11 is a perspective view showing an example tightening sleeve.

FIG. 11 is a perspective view showing an example embodiment of a tightening sleeve 114. As shown, tightening sleeve 114 includes a tool interface 118 that couples to the surface of tightening sleeve 114. As shown, tool interface 118 includes four protrusions that fit within four cavities of tightening sleeve 114. In other examples, there may be a greater or fewer number of protrusions on tool 118 and cavities on tightening sleeve 114. In another example, tool interface 118 is welded or otherwise attached to tightening sleeve 114.

Figure 12:
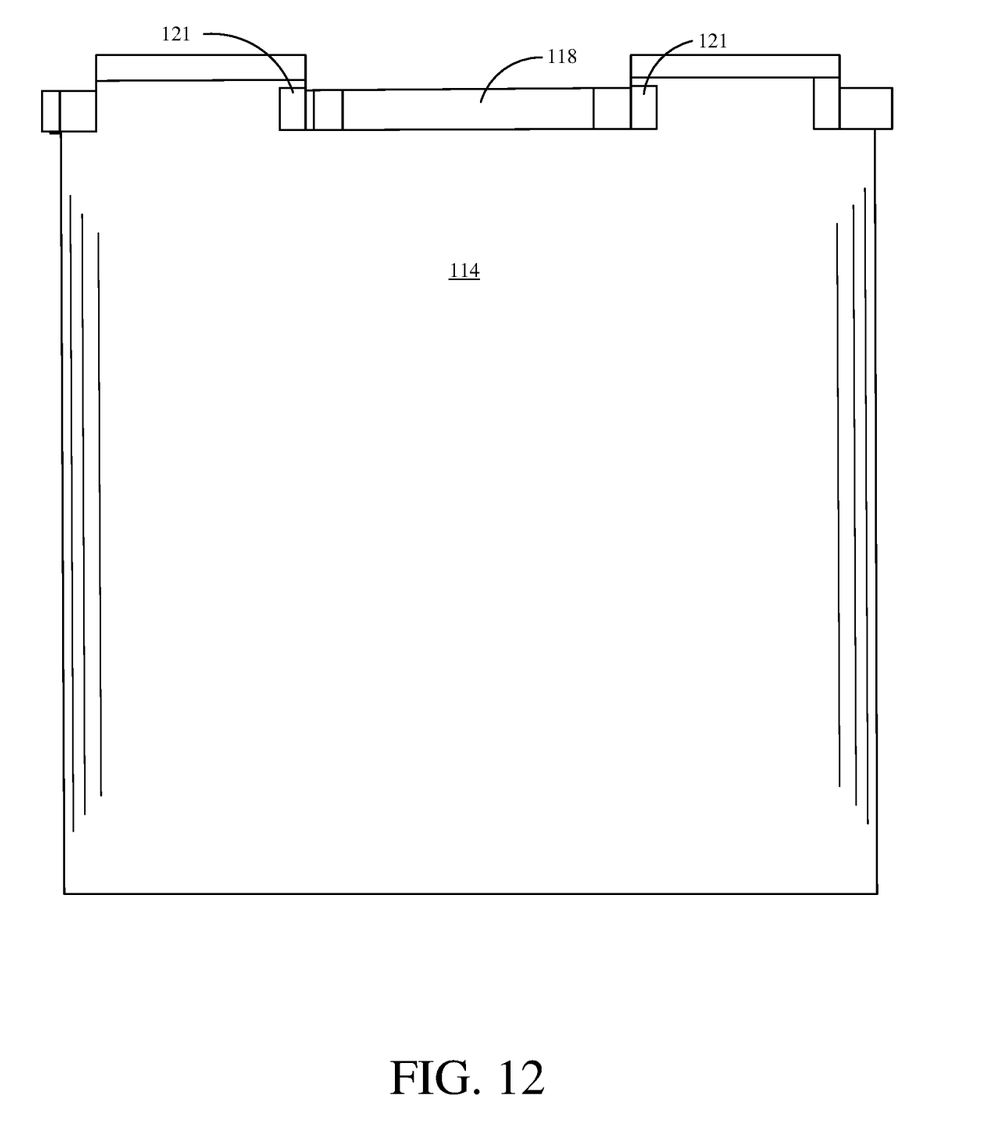
FIG. 12 shows a side view of an example tightening sleeve.

FIG. 12 shows a side view of an example embodiment of a tightening sleeve 114. As shown, tool interface 118 is fit within a channel of tightening sleeve 114 and when tool interface 118 is rotated it seats within slots 121 of tightening sleeve 114, such that tool interface 118 does not separate from sleeve 114 during the tightening process or loosening process.

Although the present invention has been described with reference to preferred embodiments, workers skilled in the art will recognize that changes may be made in form and detail without departing from the spirit and scope of the invention.

What is claimed is:

1. A piece of playground equipment that includes a system for tensioning one or more cables, the system comprising:
   a cable retaining device having a cylindrical shaped body with threads disposed around an outer circumferential surface, the outer circumferential surface being interrupted in at least one location by one or more cable receiving channels; and
   wherein the system further comprises a tightening sleeve into which the cable retaining device is treaded such that the cable retaining device moves as the tightening sleeve is rotated.

2. The piece of playground equipment of claim 1, wherein the one or more cable receiving channels includes a top surface of the cylindrical shaped body, the top surface being configured to restrict movement of an end of a cable that is inserted into the one or more cable receiving channels and being pulled in a direction that is away from the top surface in the direction of a bottom surface of the cylindrical shaped body.

3. The piece of playground equipment of claim 1, wherein said at least one location is at least two locations.

4. The piece of playground equipment of claim 1, wherein the cable retaining device is concealed within a portion of the piece of playground equipment when the piece of playground equipment is fully assembled.

5. The piece of playground equipment of claim 1, wherein the cable retaining device is situated within a multiple piece container when the piece of playground equipment is fully assembled.

6. The piece of playground equipment of claim 1, wherein a cable end is secured within the cable receiving channel when the piece of playground equipment is fully assembled.

7. The piece of playground equipment of claim 1, wherein an end of a cable is positioned between the tightening sleeve and the cable retaining device when the piece of playground equipment is fully assembled.

8. The piece of playground equipment of claim 7, wherein a tensioning of the cable is configured to tighten or loosen depending upon a position of the cable retaining device within the tightening sleeve.

9. The piece of playground equipment of claim 8, wherein the position of the cable retaining device within the tightening sleeve is adjustable by turning the tightening sleeve in a circular motion in either direction.

10. The piece of playground equipment of claim 9, wherein said turning of the tightening sleeve changes the tensioning of the cable by changing the position of the cable retaining device within the tightening sleeve.

11. A piece of playground equipment that includes a system for tensioning one or more cables, the system comprising:
a tightening sleeve that, when turned, changes a tensioning of the cable by changing a position of a cable retaining device within the tightening sleeve; and
wherein the tightening sleeve, when turned, is configured to change the tensioning of multiple cables simultaneously by changing the position of the cable retaining device within the tightening sleeve.

12. The piece of playground equipment of claim 11, wherein the multiple cables is at least four separate cables.

13. The piece of playground equipment of claim 11, wherein an end of at least one of the multiple cables is situated between the tightening sleeve and the cable retaining device when the piece of playground equipment is fully assembled.

14. The piece of playground equipment of claim 11, wherein an end of the cable is set by the cable retaining device when the piece of playground equipment is fully assembled.

15. A method for tensioning one or more cables incorporated into a piece of playground equipment, the method comprising:
inserting a first cable laterally through a first channel in a cable retaining device;
inserting a second cable laterally through a second channel in the cable retaining device;
attaching the cable retaining device to a tightening sleeve; and
increasing a level of tension on the cable by rotating the tightening sleeve and thereby changing a position of the cable retaining device within the tightening sleeve.

16. The method of claim 15, wherein inserting the first cable further comprises setting an end of the first cable within a recess formed in a surface of the cable retaining device.

17. The method of claim 15, wherein attaching the cable retaining device to the tightening sleeve comprises threading the cable retaining device to the tightening sleeve.

18. The method of claim 15, wherein rotating the tightening sleeve comprises utilizing a tool to turn the tightening sleeve.

* * * * *